(12) United States Patent  (10) Patent No.: US 7,574,421 B2
Pahno  (45) Date of Patent: Aug. 11, 2009

(54) EXPLICIT KEY PAGING

(75) Inventor: Achilles N. Pahno, Douglasville, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 11/473,427

(22) Filed: Jun. 23, 2006

(65) Prior Publication Data

US 2007/0233642 A1  Oct. 4, 2007

Related U.S. Application Data

(60) Provisional application No. 60/787,263, filed on Mar. 30, 2006.

(51) Int. Cl.
*G06F 17/30* (2006.01)

(52) U.S. Cl. .............................................. 707/2; 707/3

(58) Field of Classification Search ........................ None
See application file for complete search history.

(56) References Cited

U.S. PATENT DOCUMENTS

| | | | |
|---|---|---|---|
| 5,701,454 A | 12/1997 | Bhargava et al. | |
| 5,924,089 A | 7/1999 | Mocek et al. | |
| 6,009,271 A | 12/1999 | Whatley | |
| 6,564,204 B1 | 5/2003 | Amundsen et al. | |
| 6,665,678 B2 | 12/2003 | Ching Chen et al. | |
| 6,721,731 B2 | 4/2004 | Cornwell et al. | |
| 6,748,378 B1 | 6/2004 | Lavender et al. | |
| 6,826,562 B1 | 11/2004 | Leung et al. | |
| 6,985,904 B1 * | 1/2006 | Kaluskar et al. | ............ 707/101 |
| 7,203,691 B2 * | 4/2007 | Ramesh et al. | .............. 707/101 |
| 2005/0273716 A1 | 12/2005 | Pahno | |
| 2007/0094233 A1 * | 4/2007 | Otter et al. | ..................... 707/1 |
| 2007/0185850 A1 * | 8/2007 | Walters et al. | ................. 707/3 |

* cited by examiner

*Primary Examiner*—Don Wong
*Assistant Examiner*—Belinda Xue (57) ABSTRACT

A method of retrieving a page of records from a database system may include receiving a first query from a client device that, when processed by a database system, identifies a plurality of records that have a specified order and that are transmittable to the client device in pages that each have a fixed number of records. The method may further include receiving input identifying a specific page of records; generating a second query from the first query and the received input; submitting the second query to the database system for processing to retrieve the determined records; and transmitting the retrieved, determined records to the client device. When processed, the second query may (i) identify a first subset of the plurality of records; (ii) identify a second subset; and (iii) determine records in the first subset that are not in the second subset.

8 Claims, 7 Drawing Sheets

FIG. 1

Used_Cars 200

| Make | Model | Trim | Year | Color | Mileage | Price | GUID |
|------|-------|------|------|-------|---------|-------|------|
| Dodge | Caravan | Sport | 2002 | White | 72,596 | $9,990 | 625 |
| Toyota | Camry | LE | 2005 | Silver | | | |
| Chevrolet | Tahoe | LE | 2002 | | | | |
| Honda | Pilot | EX | 2005 | | | | |
| Buick | Century | | | | | | |
| Toyota | Camry | | | | | | |
| Dodge | Caravan | | | | | | |
| Ford | Explorer | | | | | | |
| Chevrolet | Blazer | | | | | | |
| Chevrolet | Cavalier | | | | | | |
| Honda | Civic | | | | | | |
| Dodge | Durango | | | | | | |
| Dodge | Intrepid | | | | | | |
| Ford | Explorer | | | | | | |
| Buick | Century | | | | | | |
| Dodge | Caravan | | | | | | |

| IMAGES | MODEL | TRIM | YR. | COLOR | MILEAGE | PRICE | GUID |
|---|---|---|---|---|---|---|---|
| 📷 | Caravan | SE 3.3L 6CY | 2003 | White | 99,830 | $6,990 | 071 |
|  | Caravan | EL | 2002 | Blue | 94,684 | $7,955 | 075 |
| 📷 | Caravan | SE Minivan 4 | 2003 | Cranberry | 90,592 | $7,995 | 042 |
| 📷 | Caravan | SE | 2003 | White | 45,000 | $8,500 | 474 |
| 📷 | Caravan | Sport | 2003 | Light Almon | 69,156 | $8,881 | 221 |
| 📷 | Caravan | 4D Wagon SE | 2002 | Aquamarine | 60,711 | $8,980 | 050 |
|  | Caravan | EL | 2002 | Silver | 42,652 | $8,997 | 093 |
| 📷 | Caravan | Sport | 2002 | White | 72,596 | $9,990 | 625 |
| 📷 | Caravan | SE | 2002 | GR | 74,005 | $9,995 | 772 |
| 📷 | Caravan | Sport 3.06 6CY | 2002 | Blue | 69,702 | $9,999 | 103 |
|  | Caravan | SE | 2002 | Burgandy | 43,000 | $10,000 | 745 |
| 📷 | Caravan | SE | 2003 | Seafoam | 50,526 | $10,850 | 090 |
| 📷 | Caravan | SE 3.3L 6CY | 2003 | Blue | 40,005 | $10,925 | 817 |
|  | Caravan | SE | 2002 | Silver | 76,687 | $10,930 | 963 |
| 📷 | Caravan | SXT FWD 4DR | 2003 | Garnet | 34,204 | $12,450 | 893 |
| 📷 | Caravan | SE 4DR 3.3L | 2005 | Blue | 29,766 | $12,989 | 930 |
| 📷 | Caravan | SXT | 1002 | Red | 39,156 | $12,990 | 235 |
| 📷 | Caravan |  | 2005 | Magnatism | 29,055 | $12,990 | 454 |
|  | Caravan | SE | 2006 | Lt Blue/Gra | 7,235 | $12,991 | 725 |
| 📷 | Caravan | SXT | 2003 | Deep Molten | 35,027 | $12,995 | 025 |
| 📷 | Caravan | SE | 2005 | Red | 11,990 | $12,995 | 240 |
| 📷 | Caravan | SE | 2005 | Blue | 25,554 | $12,995 | 616 |
| 📷 | Caravan | SXT | 2003 | Red | 40,091 | $12,998 | 195 |

|     |         |              | t1   |             |        |         |
| --- | ------- | ------------ | ---- | ----------- | ------ | ------- |
| 071 | Caravan | SE 3.36 6CY  | 2003 | White       | 99,830 | $6,990  |
| 975 | Caravan | EL           | 2002 | Blue        | 94,684 | $7,995  |
| 042 | Caravan | SE Minivan 4 | 2003 | Cranberry   | 90,592 | $7,995  |
| 474 | Caravan | SE           | 2003 | White       | 45,000 | $8,500  |
| 221 | Caravan | Sport        | 2002 | Light Almon | 69,156 | $8,881  |
| 050 | Caravan | 4D Wagon SE  | 2002 | Aquamarine  | 60,711 | $8,980  |
| 093 | Caravan | EL           | 2002 | Silver      | 42,625 | $8,997  |
| 625 | Caravan | Sport        | 2002 | White       | 72,596 | $9,990  |
| 772 | Caravan | SE           | 2002 | GR          | 74,005 | $9,995  |
| 103 | Caravan | Sport 3.06 6CY | 2002 | Blue      | 69,702 | $9,999  |

FIG. 6A

|     |         |              | t2   |             |        |        |
| --- | ------- | ------------ | ---- | ----------- | ------ | ------ |
| 071 | Caravan | SE 3.36 6CY  | 2003 | White       | 99,830 | $6,990 |
| 975 | Caravan | EL           | 2002 | Blue        | 94,684 | $7,995 |
| 042 | Caravan | SE Minivan 4 | 2003 | Cranberry   | 90,592 | $7,995 |
| 474 | Caravan | SE           | 2003 | White       | 45,000 | $8,500 |
| 221 | Caravan | Sport        | 2002 | Light Almon | 69,156 | $8,881 |

FIG. 6B

| t2 guid | t1 guid | t2 RIGHT OUTER JOIN t1 |                  |
| ------- | ------- | ---------------------- | ---------------- |
| 071     | 071     | 071                    |                  |
| 975     | 975     | 975                    |                  |
| 042     | 042     | 042                    |                  |
| 474     | 474     | 474                    |                  |
| 221     | 221     | 221                    |                  |
|         | 050     | 050                    | (t1 Guid = NULL) |
|         | 093     | 093                    | (t1 Guid = NULL) |
|         | 625     | 625                    | (t1 Guid = NULL) |
|         | 772     | 772                    | (t1 Guid = NULL) |
|         | 103     | 103                    | (t1 Guid = NULL) |

FIG. 6C

| |
|---|
| 050 |
| 093 |
| 625 |
| 772 |
| 103 |

EXPLICIT KEY PAGING

CROSS-REFERENCE TO RELATED APPLICATIONS

This document claims priority to U.S. Application Ser. No. 60/787,263, filed on Mar. 30, 2006.

FEDERALLY SPONSORED RESEARCH OR DEVELOPMENT

The U.S. Government may have certain rights in this invention pursuant to contracts GF07592J18 and GF10179J18, awarded by the U.S. Centers for Disease Control and Prevention.

TECHNICAL FIELD

This document generally relates to data processing.

BACKGROUND

Databases may be used to store and manipulate a wide variety of data, often in various tables. A Relational Database Management System (RDBMS) is a database management system (DBMS) that uses relational techniques for storing and retrieving data. In an RDBMS, data is generally structured into relations, each relation dealing with one or more attributes and comprising one or more objects, or "tuples," of data. The objects generally associate attribute values with each other. A relation may be visualized as a table, having rows and columns; the columns of the table represent attributes of the relation, and the rows of the table represent individual objects or records that have the related attributes and attribute values. Each row in a table is generally distinguishable from all other rows in the table by at least one column. In database terminology, this column is generally referred to as a "primary key" of the table. In some implementations, the primary key is an integer identifier, such as, for example, a globally unique identifier (GUID).

An RDBMS may have an interface that is designed to receive and process Structured Query Language (SQL) statements. SQL interfaces have evolved into a standard language for RDBMS systems, and SQL has been adopted as such by both the American National Standards Organization (ANSI) and the International Standards Organization (ISO). An SQL interface generally supports various operators with which users can formulate statements to manipulate data in one or more tables and produce new tables as a result. SQL operations may be written as nested relational expressions, where the output of one operation is used as the input to the next operation. Thus, SQL may be used to perform complex operations with a small number of statements.

One of the most common SQL statements executed by RDBMS software is the SELECT statement. A SELECT statement generally has the format: "SELECT <clause> FROM <clause> WHERE <clause>." The result of such a SELECT statement is a subset of data retrieved by the RDBMS software from one or more existing tables stored in the relational database and specified by the FROM clause. The WHERE clause determines which rows should be returned in the result table and generally includes a search condition to be satisfied by each row returned in the result table. The rows that meet the search condition form an intermediate set, which is then processed further according to specifications in the SELECT clause. The SELECT statement may optionally include a grouping function indicated by a GROUP BY clause. The GROUP BY clause causes the rows in the intermediate result set to be grouped according to the values specified in the clause.

Another operation permitted by SQL is the JOIN operation, which concatenates horizontally all or parts of two or more tables to create a new resulting table. The JOIN operation is implied by naming more than one table in the FROM clause of a SELECT statement.

As mentioned above, queries may be received in an SQL system by an SQL interface. The queries may be rewritten in an SQL processor or compiler from the input format provided by a user into generally standard SQL language. To evaluate a query, an SQL execution plan may be generated by the SQL processor from the rewritten SQL queries and may be provided to an SQL optimizer, which may determine an efficient manner to execute the query. Because of optimization, not every SQL query may be "materialized" by the database system in its entirety; rather, an RDBMS may include substantial logic to avoid materializing intermediate results. Execution of the optimized SQL query generally identifies one or more rows in a database table having data that is responsive to the original query. The one or more rows having data that is responsive to an SQL query that is submitted by a client device may be returned to the client device according to a number of methods.

One method of returning responsive data to a client device is to return a set of primary keys associated with each row. The client device may then submit one or more keys to retrieve the rest of the data included in rows corresponding to the keys. According to this method, access to data that is responsive to an SQL query requires two transactions between the client device and the database system: a first access to obtain primary key(s) for data that is responsive to the SQL query, and a second access to obtain the data associated with the primary key(s).

A second method of returning responsive data to a client device is to use a "cursor structure" that is maintained on the server providing the data. The one or more rows having data that is responsive to the SQL query may be formatted as a temporary table, and a cursor may be instantiated that allows the client device to access records sequentially, based on a specific result pointed to by the cursor. Generally, a cursor is a named control structure used by an application program to point to a row of interest within some set of rows and to retrieve rows from the set, possibly making updates and deletions. An application can then access data on a row-by-row basis from the result table. Two specific kinds of cursors are scrollable cursors and forward-only cursors.

Scrollable cursors may allow an application or client device to fetch rows forward or backward from a current position. Typical scrolling requests include moving one row forward, one row back, to the beginning, or to the end of the result set. A forward-only cursor may allow an application or client device to fetch rows forward serially from the start to end of a result set.

A third method of returning responsive data to a client device is to use a cursor structure that is maintained on the client device. In either the second or third method, a client device may access specific database rows or records by executing instructions that cause the cursor to be advanced or repositioned.

SUMMARY

In one general aspect, a method of retrieving a page of records from a database system includes receiving a first query from a client device that, when processed by a database system, identifies a plurality of records in a database. The plurality of records may have a specified order and may be transmittable to the client device in pages, where each page has a fixed number of records from the plurality of records. The method may further include receiving input identifying a specific page of records to retrieve and transmit to the client device; generating a second query from the first query and the received input; submitting the second query to the database system for processing to retrieve the determined records; and transmitting the retrieved, determined records to the client device. When processed by the database system, the second query may (i) identify a first subset of the plurality of records, where the first subset consists of records having positions in the specified order from a first position to a position corresponding to a last record of the identified specific page of records; (ii) identify a second subset of the plurality of records, where the second subset consists of records having positions in the specified order from the first position to a position corresponding to a record that immediately precedes the identified specific page of records; and (iii) determine records in the first subset that are not in the second subset.

In some implementations, identifying the first subset includes identifying records having positions in the specified order from a first position to a position corresponding to the fixed number multiplied by a number corresponding to the identified specific page of records. Identifying the second subset may include identifying records having positions in the specified order from a first position to a position corresponding to the fixed number multiplied by the number corresponding to the identified specific page of records, minus the fixed number. The first query may be a first structured query language (SQL) statement. The method may further include receiving the fixed number of records per page. Determining records in the first subset that are not in the second subset may include determining identifiers for the records. The identifiers may be database keys or globally unique identifiers.

In another general aspect, a method of retrieving specific data records from a plurality of data records may include receiving from a client application a number corresponding to a request for a specific page of records in a system having access to a plurality of data records. The plurality of data records may have a specific order and may be retrievable in pages, where each page has a fixed number of records. The method may further include identifying a first subset of the plurality of data records, where the first subset consists of records having positions in the specific order from a first position to a position corresponding to the fixed number multiplied by the number corresponding to the request for the specific page of records. The method may further include identifying a second subset of the plurality of data records, where the second subset consists of records having positions in the specific order from the first position to a position corresponding to the fixed number multiplied by the number corresponding to the request for the specific page of records, minus the fixed number. The method may further include determining the records that are in the first subset but not in the second subset; and providing the determined records to the client application.

In some implementations, the method further includes receiving from the client application a query statement that, if executed, would identify the plurality of data records. The method may further include displaying the determined records in an output device associated with the client application. The method may further include receiving from the client application a second number corresponding to a second request for a different page of records.

The plurality of data records may be stored in a relational database management system (RDBMS). The plurality of records may be accessible via execution of a structured query language (SQL) statement by the RDBMS. The method may further include receiving from the client application a first SQL statement that identifies the plurality of data records in the specific order.

In some implementations, identifying the first subset, identifying the second subset and determining the records may include generating a second SQL statement from the first SQL statement and submitting the second SQL statement to the RDBMS for execution. The second SQL statement may include a right outer join operator or a left outer join operator. The second SQL statement may be based in part on the fixed number of records in a page and the specific requested page of records. Determining the records that are in the first subset but not in the second subset may include determining a logical difference of the first subset and the second subset.

In another general aspect, a method of retrieving a page of data records from a relational database management system may include receiving from a client application, a first SQL statement. The first SQL statement may be received in a system from which data records in a relational database management system (RDBMS) are accessible by submission of one or more structured query language (SQL) statements to and subsequent execution of the one or more submitted SQL statements by the RDBMS. If executed by the RDBMS, the first SQL statement may retrieve a plurality of data records in a specific order. The method may further include receiving from the client application a number corresponding to a requested page of data records from the plurality of data records. The method may further include generating a second SQL statement from the first SQL statement that, when executed by the RDBMS retrieves records that are in a first subset of the plurality of data records but not in a second subset of the plurality of data records. The first subset may consist of data records in the plurality of data records having positions in the specific order ranging from a first position to a position corresponding to a last record of the requested page of data records. The second subset may consist of data records in the plurality of data records having positions in the specific order ranging from the first position to a position corresponding to a record that immediately precedes the requested page of data records. The method may further include submitting the second SQL statement to the RDBMS for execution and providing data records retrieved by execution of the second SQL statement to the client application.

The general and specific aspects may be implemented using a system, a method, or a computer program, or any combination of systems, methods, and computer programs. The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
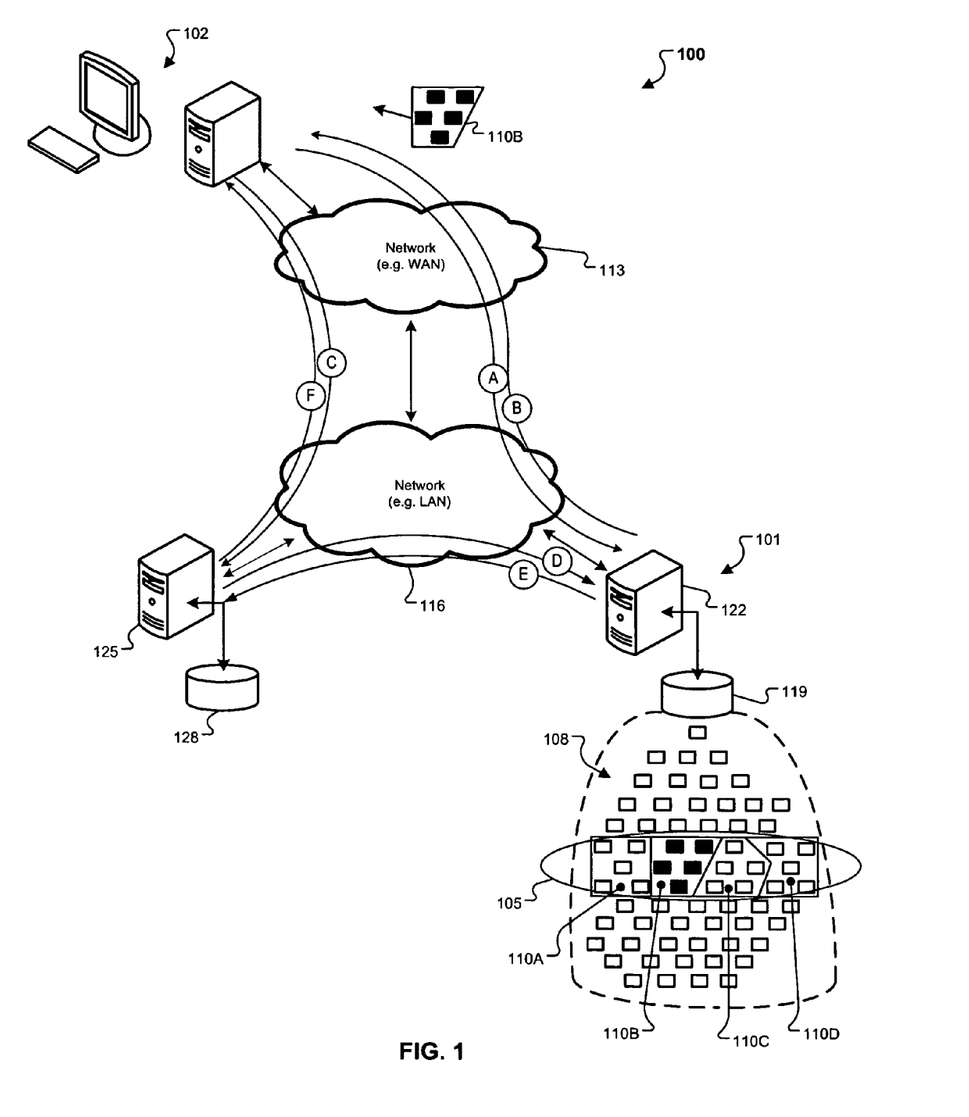
FIG. 1 is a block diagram of an example system in which specific records in a database may be retrieved and delivered to a client device.

FIG. 1 is a block diagram of an example system 100 in which specific records in a database system 101 may be retrieved and delivered to a client device 102. In operation, a user of the client device 102 may submit a query to the database system 101 (e.g., via path A) that identifies a plurality of records 105 from among records 108 that are stored in the database system 101. In some implementations, the query indirectly identifies the plurality of records 105 (e.g., according to a set of search parameters); in some implementations, the query directly identifies the plurality of records 105, or at least a portion 110B of the plurality of records 105 (e.g., by primary keys). The plurality of records 105 may be retrievable in pages 110A, 110B, 110C and 110D, where each page includes a fixed number of records (e.g., five). The user of the client device 102 may further specify (via path A) a specific page 110B of records to retrieve from the plurality of records 105. The database system 101 may retrieve the specific page 110B of records and transmit them to the client device (e.g., via path B).

As shown, the client device 102 and the database system 101 are coupled by one or more networks, including, for example, a first network 113, and a second network 116. In some implementations, the first network 113 is a wide area network (WAN), such as the Internet; and the second network 116 is a local area network (LAN).

The database system 101 includes a data store 119 and a database server 122. In some implementations, the database system 101 includes a relational database management system (RDBMS). An RDBMS may retrieve records in response to appropriately formatted query statements, such as, for example, structured query language (SQL) statements.

In some implementations, the client device 102 may access records in the database system 101 through a front-end computer device 125. The front-end computer device 125 may provide a user-friendly front-end to which the client device 102 submits search queries and from which the client device 102 receives results responsive to the search queries. For example, the front-end computer device 125 may receive a query from the client device 102 via path C, translate the query to a format that is appropriate for processing by the database system 101 (e.g., an SQL statement), and transmit the appropriately formatted query via path D, to the database system 101. The database system 101 may process the query to retrieve records from the database system 101 that are responsive to the query and transmit, via path E, the retrieved records to the front-end computer device 125. The front-end computer device 125 may reformat the retrieved records to a user-friendly format, such as, for example, in a hypertext mark-up language (HTML) format suitable for display by a browser running on the client device 102. The front-end computer device 125 may then transmit the reformatted records to the client device 102, via path F, for display in a browser. In some implementations, the front-end computer device 125 is a web server that may serve other content from a data store 128 to devices coupled to the networks 113 and 116. The content stored in the data store 128 may be independent of content in the database system 101.

Although the front-end computer device 125 and the database server 122 are shown as connected to a single network 116, these devices 125 and 107 may be separated by various other networks (not shown), and may be disposed in physically distinct locations. Alternatively, the front-end computer device 125 and the database server 122 may comprise a single computing device, and the network 116 may comprise an internal communication channel (e.g., a data bus) within the computing device. Other network types and topologies are possible.

Figure 2:
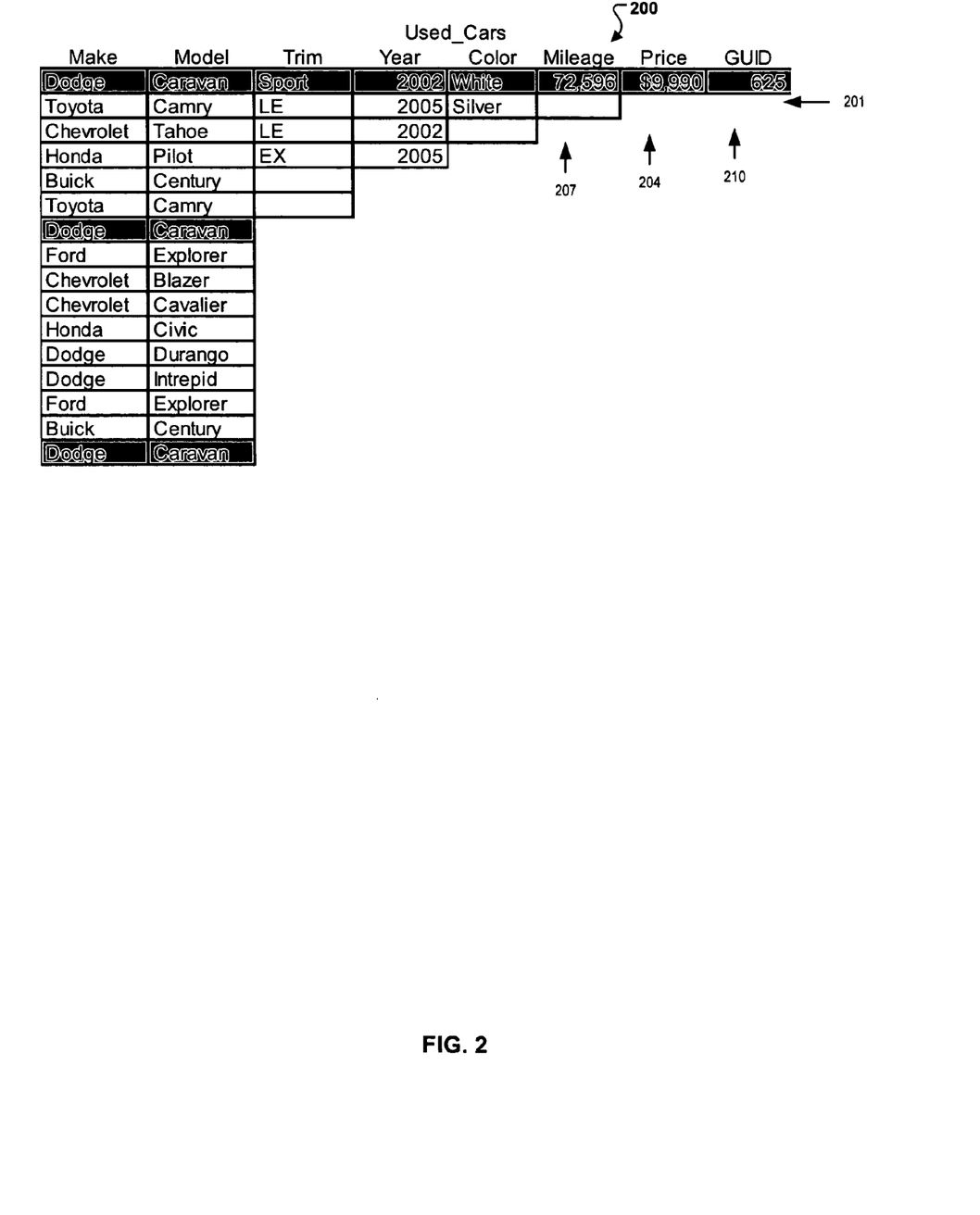
FIG. 2 illustrates portions of an example table from a database.
Figure 3:
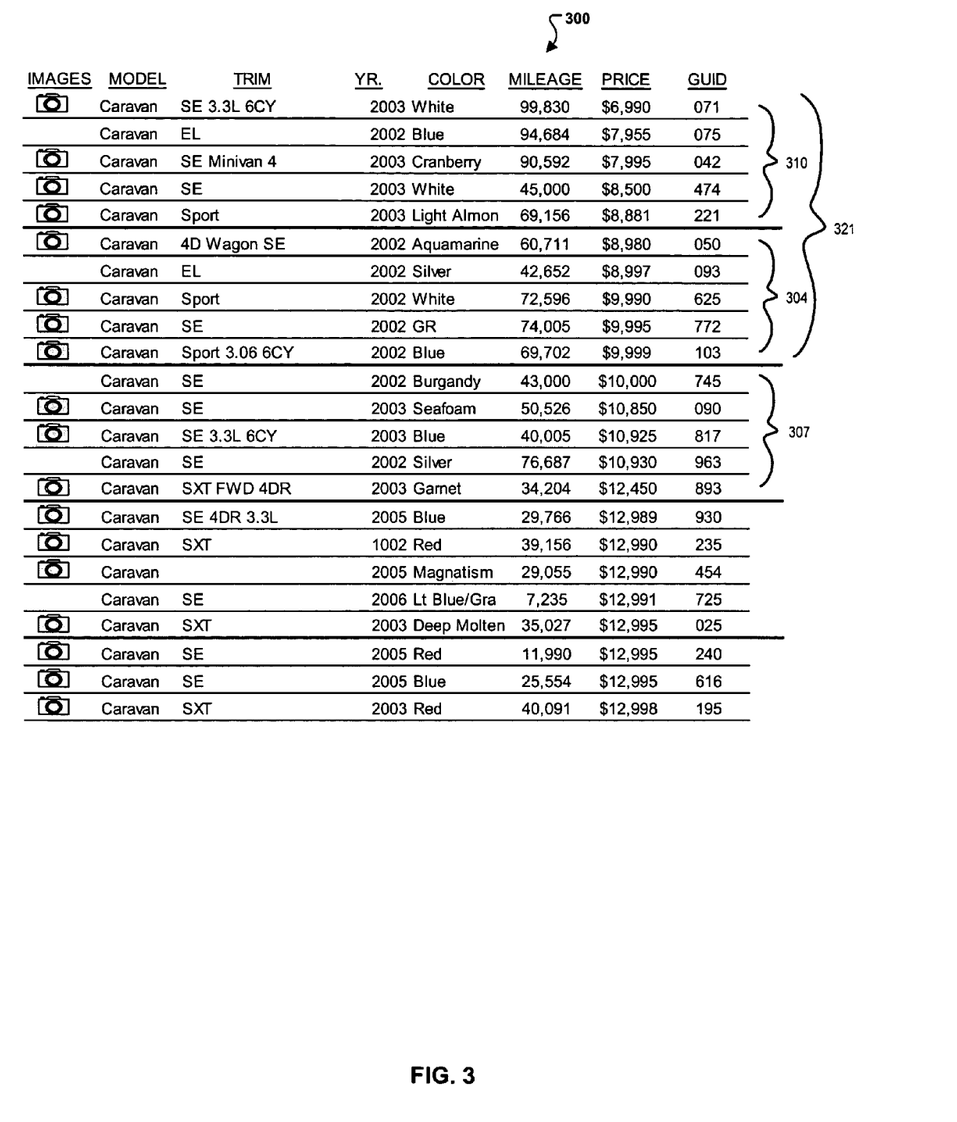
FIG. 3 illustrates example records from the table that is shown in FIG. 2.

An example application of the system 100 that is shown in FIG. 1 is now described with reference to FIGS. 2, 3, and 4. In the example application, the database system 101 stores information related to used cars that are for sale. The information may be maintained by an online provider, such as, for example, CarSoup.com, available at http://www.carsoup.com. The online provider may store the information in a table 200 called "used_cars," example portions of which are shown in FIG. 2.

As shown, each column in the table 200 stores attribute values for specific attributes of the various cars represented in the table 200. For example, the "price" column 204 stores current list prices for various cars, and the "mileage" column 207 stores mileage values for the various cars. Each row of the table 200 (e.g., row 201) stores various attributes corresponding to a specific car. For example, the row 201 represents a specific Dodge Caravan having a current list price 204 of $9,990 and a mileage 207 of 72,596 miles. Various other attributes are associated with this specific Dodge Caravan, some of which may not be illustrated in FIG. 2. Moreover, only a small portion of a typical database table 200 is shown in FIG. 2; in an actual application, the table 200 may have thousands of rows. Although only one value is illustrated for some columns, each row generally includes a value for each column.

Each row in the table 200 is distinguishable from all other rows in the table 200 by at least one attribute (column). In database terminology, this attribute is generally referred to as a "primary key" of the table. In some implementations, the primary key is an attribute that characterizes some aspect of the object represented by the corresponding row of data. In some implementations, the primary key is an identifier, such as, for example, a globally unique identifier (GUID). A GUID may be an integer, as shown in the GUID column 210. The database system 101 may use the primary key for certain processing operations, as will be described in more detail below.

Referring back to FIG. 1, a user of the client device 102 may submit a query to the database system 101 to identify a specific make and model of car. For example, the query may be for "Dodge Caravans." The database system 101 may run the query against the used_cars table 200 and return all rows that correspond to Dodge Caravans. Three such rows are shaded in table 200. The query may also identify an attribute by which to sort rows that are responsive to the query. For example, the query may specify that rows responsive to the query should be sorted by the price attribute 204.

In some implementations, the database server 122 may process SQL statements to execute a query and retrieve corresponding records from the data store 119. The front-end computer device 125 may generate, or otherwise process, these SQL statements from, for example, input received through an interface running on the front-end computer device 125. In particular, the front-end computer device 125 may provide a graphical interface for an online car sales entity (e.g., CarSoup.com). The interface may receive input from a client device, for example, to specify a make and model and other pertinent parameters of cars for which to search and an attribute to use in sorting results (e.g., price). Programming code associated with the interface may translate the user input into SQL statements that can be executed by the database server 122 to retrieve various records associated with cars that meet the pertinent parameters received from the client device FIG. 3 shows example records 300 from the table 200 that are responsive to a query for "Dodge Caravans" and that are sorted by the price attribute 204. The example records 300 may be provided in response to execution of SQL statements by the database system 101. The SQL statements may have been generated by the front-end computer device 125 in response to input received from the client device 102. In some implementations, the records 300 may be stored in a temporary table in the database system 101.

The rows each correspond to records, and each record corresponds to a specific car. Each car has various attributes (fields, or columns) such as, model, year, color, mileage, etc. In addition, as shown in FIG. 3, each record may include one or more images, depicted graphically as a camera icon. The example records 300 may include a link to the images, or the images themselves may be stored within the records 300. In some implementations, the images may be stored in a separate table in the database system 101, distinct from the table 200, in which the records 300 may represent the result of a JOIN operation between two tables (e.g., the used_cars table 200 and an images table (not separately shown)).

As described above, the records 300 retrieved from the database system 101 in response to a query may be reformatted to a user-friendly format, such as, for example, HTML, for display by a browser on the client device 102. Part of the reformatting process may involve grouping the records into "pages," where each page includes a fixed number of records. (Note that the last page in a group of records may have fewer than the fixed number or records if the total number of records is not evenly divisible by the fixed number.) In FIG. 3, row groupings 304, 307 and 310 may each correspond to a five-record page.

Figure 4:
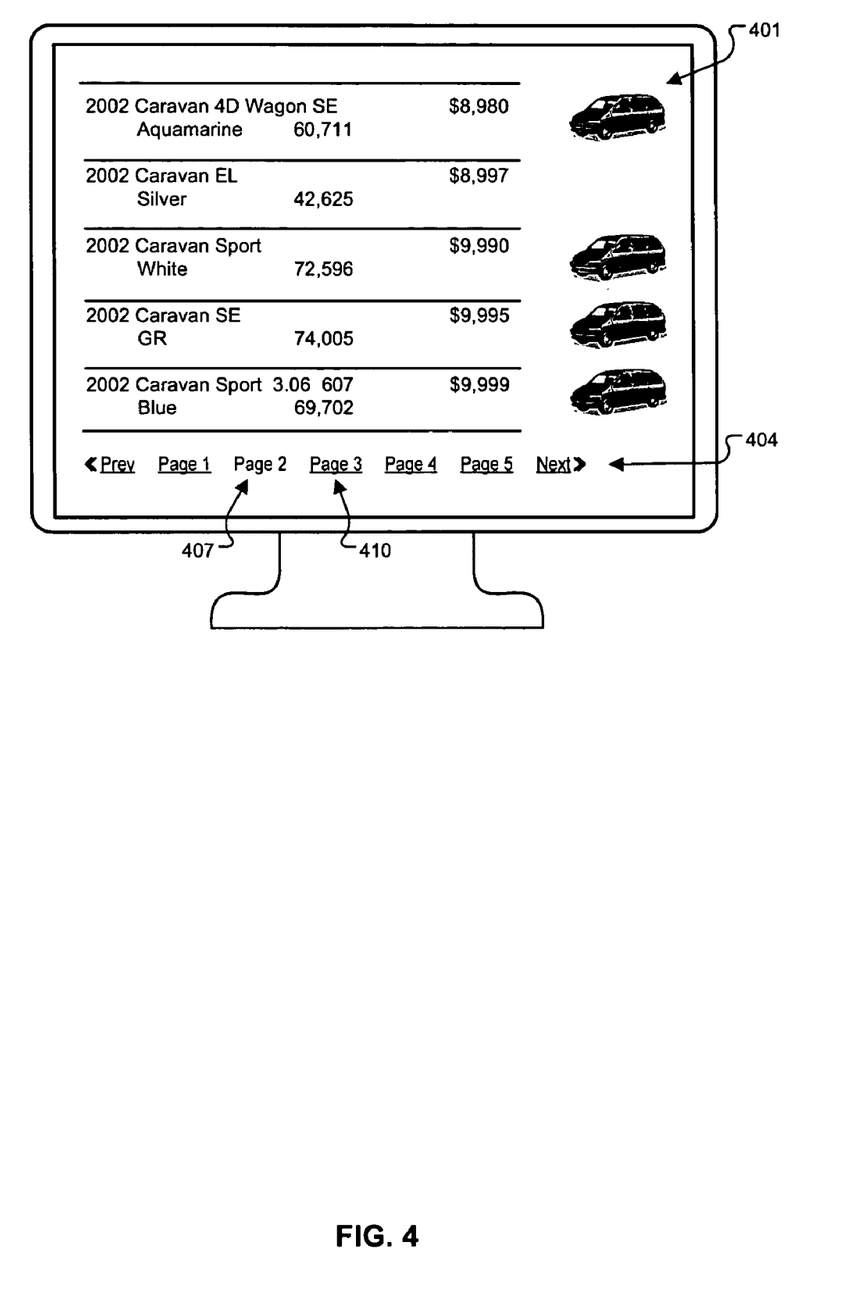
FIG. 4 is an example screenshot illustrating how one page of records may be displayed in a browser on a client device.

FIG. 4 illustrates an example screenshot 401 illustrating how one page of the reformatted records 304 may be displayed in a browser on the client device 102. As shown, text that represents the various attributes of a record (e.g., specifications for a specific Dodge Caravan) is displayed for each record on the page, along with an image corresponding to the record, if one exists.

In addition to providing information about a page of records, the screenshot 401 shows example controls 404 by which a user of the client device may navigate to other pages of records that are also responsive to the query. For example, a user may use the controls 404 to navigate to a "previous" page of records, a "next" page of records or a specific page of records (e.g., selection of control 410 may cause a "third" page of records to be displayed). In some implementations, the controls 404 are hyperlinks that cause a browser screen to be updated with new content. An indicator 407 (e.g., text that is not a hyperlink) may be provided to indicate which page of records is currently displayed.

In some implementations, a number of records that are to be included in each page may correspond to a number of records that can be displayed in a particular format on the client device 102 without forcing a user of the client device 102 to scroll in order to view content. For example, the number of records may be configured for display in a 1024×768 pixel format screen, using a default font. In some formats, the number of records in a page may be such that a user of the client device 102 must scroll in order to view some of the content. In some implementations, the number of results that characterizes a page may be user configurable (e.g., a user of the client device 101 may configure the number of records per page). In some implementations, the number of results that characterize a page may be fixed or set by a system administrator or system code. For example, code on the front-end computer device 125 or code associated with a web page that is accessed by the client device 102 may fix the number of result per page (e.g., at five results/page, as shown). However the number of records per page is determined, this number and the overall number of results that are responsive to a query may determine how many total pages of records can be retrieved.

Referring again to FIG. 3, twenty-three Dodge Caravan records are shown in the example records 300. If there are to be five records per page, then the example records 300 include five "pages" of results. The records shown in the screenshot 401 correspond to the records 304 in FIG. 3. Note that the records 300 could have been divided into pages differently, leading to a different number of pages (e.g., four records per page, yielding six total pages for twenty-three records).

To display a new page (or any page in the first instance), the systems described above may generate various SQL statements for obtaining records from the database. In some implementations, these SQL statements may explicitly call out specific records in the database system 101 (e.g., by identifying specific GUIDs for which corresponding records should be retrieved). The methods that will now be described in greater detail may minimize the number of requests that are sent to the database server 107 and may further minimize the number of results that must be stored in either the front-end computer device 125 or the client device 102. Accordingly, the methods described herein may conserve network bandwidth, memory usage or processing power of various devices in the system.

Figure 5:
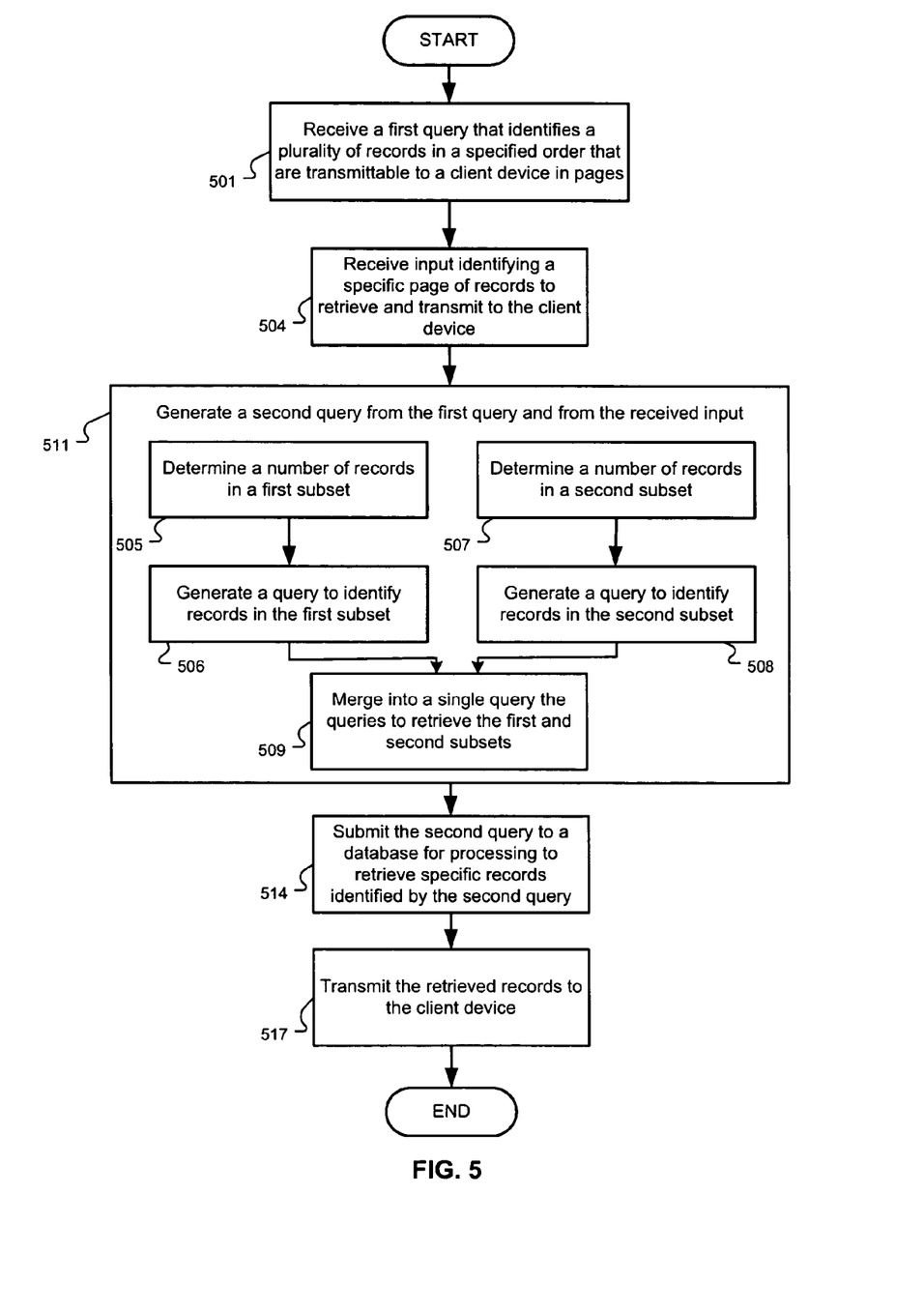
FIG. 5 is a flow diagram of an example method that may be used to retrieve a page of records form a database system.

FIG. 5 is a flow diagram of an example method 500 that may be used to retrieve a page of records from a database system. The method 500 may be implemented by hardware, software or a combination of the two. For example, the method may be implemented by programming code executed by the front-end computer device 125, the client device 102 or the database system 107, or any combination of these devices.

The method 500 includes receiving (501) a first query that, when processed by a database system, identifies a plurality of records in a database in a specified order. For example, the front-end computer device 125 may receive input from the client device 102 specifying a query for certain records, in a certain order, in the database system 101. More particularly, the front-end computer device 125 may receive input from the client device 102 that specifies a query for "Dodge Caravans" to be executed against a database of used cars that are for sale (e.g., the used_cars database table 200), with results being returned in order by price, from a lowest price to a highest price. The front-end computer device 125 may build an SQL statement to execute this query, such as the example SQL Statement 1, provided below:

SELECT year, model, price, color, mileage FROM used_cars
WHERE model='caravan' ORDER BY price ASC Building the first query may also include specifying a fixed number of records to associate with each page of records identified by the first query. For example, code running on the front-end computer device 125 may specify that each page is to include five records. The number of records per page may be specified or provided by various sources. For example, the fixed number may be entered by a user of the client device 102; the fixed number may be determined based on the size of each record and a resolution or size of a screen associated with the client device; the fixed number may be included in code running on the front-end computer device 125; or the fixed number may be provided by the database system 101—to name a few examples.

The method 500 includes receiving (504) input that identifies a specific page of records. For example, the front-end computer device 125 may receive input from the client device identifying a specific page of records (e.g., "page 2," or a "second page"). In some implementations, the input identifying a specific page of records is received (504) after an initial default page of records is retrieved from the database system 101 and returned to the client device 102. The initial, default page may include a first page of records when the records are retrieved in an order specified by the first query. In other implementations, the input identifying a specific page of records is received (504) before any records are retrieved from the database system and returned to the client device 102.

The method 500 includes generating (511) a second query from the first query and from received input that identifies the specific page of records. For example, the front-end computer device 125 may generate (511) the second query. In some implementations, generating (511) the second query may involve various intermediate actions. For example, generating (511) the second query may include generating (506) a query that identifies a first subset of records after determining (505) a number of records to include in the first subset, generating (508) another query that identifies a second subset of records after determining (507) a number of records to include in the second subset, and determining the logical difference between the first subset and the second subset (i.e., determining records in the first subset that are not in the second subset) by merging (509) the first and second subset-queries. These example intermediate actions are now described.

Generating (511) a second query may include determining (505) a number of records in a first subset. In some implementations, the first subset includes records from the plurality of records that would be identified by execution of the first query and that would have positions ranging from a first record to a last record in the specified page (when the plurality of records are arranged in the order specified by the first query). To calculate the number of records in this first subset, the method 500 may include multiplying a number corresponding to the specific requested page of records by the fixed number of records per page. In the example in which the second page is requested and in which there are five records per page, the first subset would include ten records (2×5=10).

Generating (511) a second query may include generating (506) an SQL query to identify and/or retrieve records in the first subset. For example, the front-end computer device 125 may build an SQL statement to execute this query, such as the example SQL Statement 2 provided below:

SELECT TOP 10 guid, model, trim, year, color, mileage, price FROM used_cars
WHERE model='caravan' ORDER BY price ASC AS t1

Figure 6A:
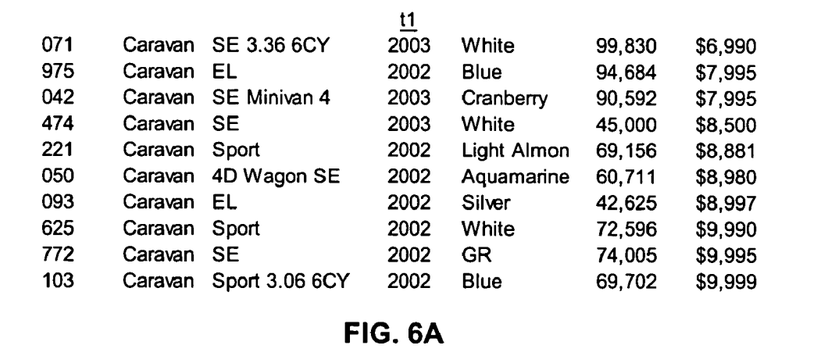
FIGS. 6A-6D illustrate portions of various records that may be identified by different actions in the example method that is shown in FIG. 5.

So that the first subset can be referenced in other queries that incorporate this query, the result may be named with the "AS t1" clause as shown above. The number "10" in the example SQL statement above corresponds to the number of records in the first subset, which may have been determined (505) as described above. Execution of the above SQL statement would retrieve the first ("TOP") ten records that are responsive to the first query when all records responsive to the query are ordered by price from the highest to the lowest ("ASC"). The example first subset of ten records is graphically illustrated in FIG. 3 (see bracket 321) and further illustrated in FIG. 6A.

Generating (511) a second query may include determining (507) a number of record in a second subset. In some implementations, the second subset includes records from the plurality of records that would be identified by execution of the first query and that would have positions ranging from a first record to a record that immediately precedes the specified page (when the plurality of records are arranged in an order specified by the first query). To determine (507) the number of records in the second subset, the method 500 may include multiplying a number corresponding to the specific requested page of records by the fixed number of records per page and subtracting the fixed number. In the example in which the second page is requested and in which there are five records per page, the second subset would include five records (2×5−5 =5).

The method 500 may include generating (508) an SQL query to identify and/or retrieve records in the second subset. For example, the front-end computer device 125 may build an SQL statement to execute this query, such as the example Statement 3 provided below:

SELECT TOP 5 guid, model, trim, year, color, mileage, price FROM used_cars
WHERE model='caravan' ORDER BY price ASC AS t2

Figure 6B:
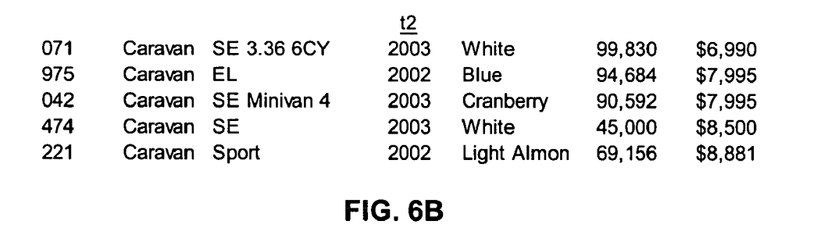

So that the second subset can be referenced in other queries that incorporate this query, the result may be named "AS t2" as shown above. The number "5" in the example SQL statement above corresponds to the number of records in the second subset, which may have been determined (507) as described above. Execution of the above statement may retrieve the first five records that meet the first query. The example second subset of five records is graphically illustrated in FIG. 3 (see bracket 310, which is in the example, represents both one page and the second subset) and further illustrated in FIG. 6B.

In some implementations, generating (511) the second query includes merging (509) into a single SQL statement separate SQL statements that, if executed, would identify the first and second subsets. In some implementations, merging (509) the statements involves performing a RIGHT OUTER JOIN on the separate SQL statements. In particular, the second query may be conceptually represented by the following example SQL Statement 4:

SELECT t2 RIGHT OUTER JOIN t1 ON t1.guid=t2.guid
WHERE t1.guid IS NULL

The example SQL Statement 4 above determines the logical difference of the first and second subsets. In particular, the RIGHT OUTER JOIN returns a table having all elements that are in common between the first and second subset, based on the guid attribute (i.e., the logical intersection of the first and second subset, where t1.guid matches t2.guid). In addition, the RIGHT OUTER JOIN returns all other elements in the right table of the RIGHT OUTER JOIN expression (t1), with the guid attribute of those elements set to NULL (i.e., the elements that are not in the intersection of the first and second subsets). The WHERE clause of the SELECT statement identifies these elements, thereby identifying the logical difference of the first and second subsets.

Figure 6C:
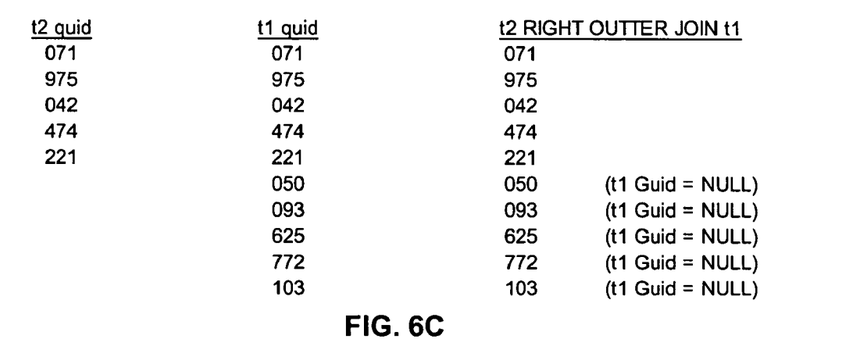
Figure 6D:
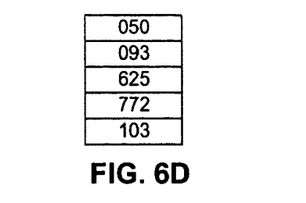

FIG. 6C illustrates guids corresponding to the first and second subsets and the effect of a RIGHT OUTER JOIN on the two subsets of the example SQL Statement 4 above. FIG. 6D illustrates the guids of records that are identified from this example SQL statement.

Replacing t1 and t2 with the previous example SQL statements yields the following example SQL Statement 5:

```
SELECT guid, model, trim, year, color, mileage, price
    FROM
        (SELECT TOP 5 model, trim, year, color, mileage, price
            FROM used_cars
            WHERE model='caravan' ORDER by price ASC)
                AS t1
        RIGHT OUTER JOIN
        (SELECT TOP 10 model, trim, year, color, mileage,
            price FROM used_cars
            WHERE model='caravan' ORDER by price ASC)
                AS t2
        ON t1.guid=t2 guid
            WHERE t1.guide IS NULL
```

Figure 7:
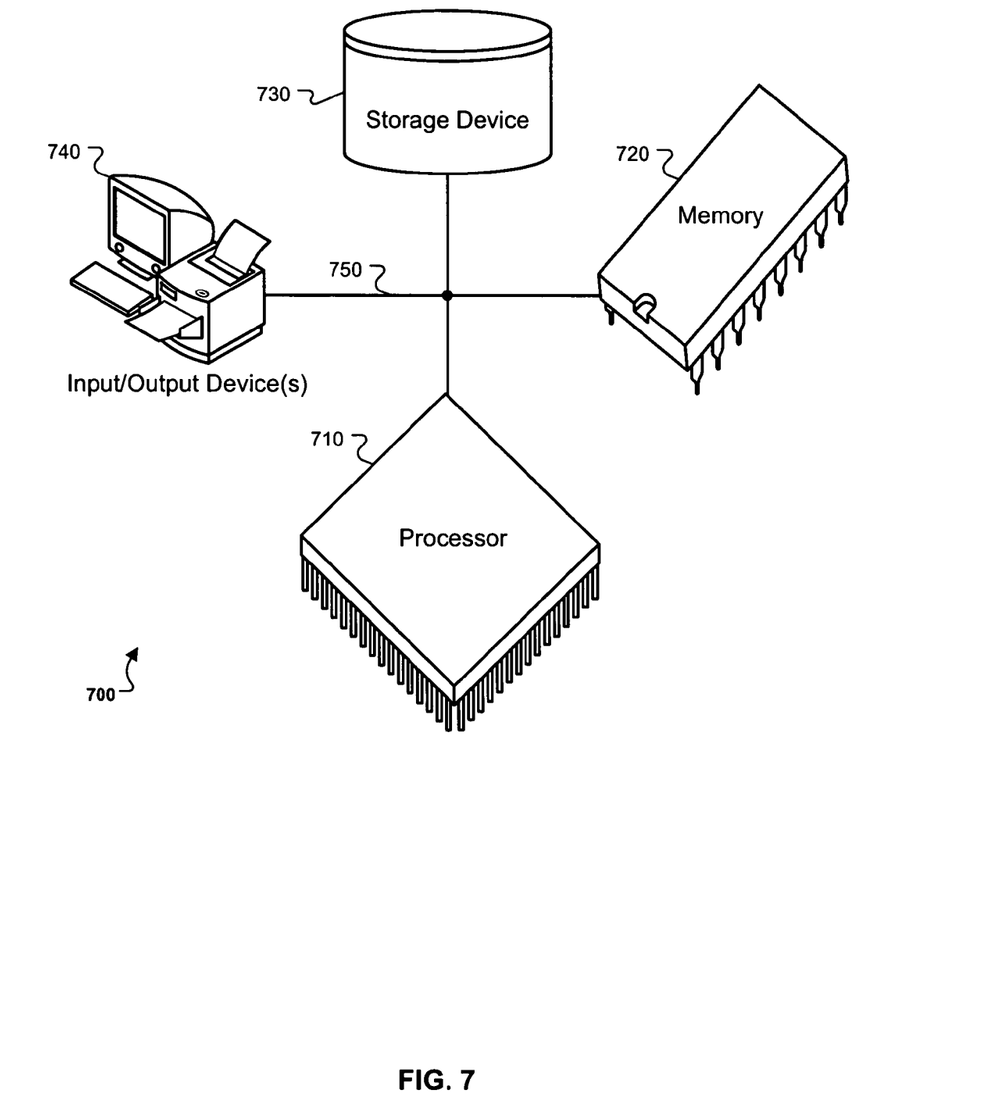
FIG. 7 is a schematic diagram of an example computing system.

FIG. 7 is a schematic diagram of an example computing system 700. The system 700 may be used in the operations described above, according to some implementations. The system 700 may be implemented by various devices describe above, including, for example, the client device 102, the front-end computer device 125 and the database server 122.

The system 700 includes a processor 710, a memory 720, a storage device 730, and an input/output device 740. Each of the components 710, 720, 730, and 740 are interconnected using a system bus 750. The processor 710 may be capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different embodiments, the storage device 730 may be a floppy disk device, a hard disk device, an optical disk device, or a tape device.

The input/output device 740 provides input/output operations for the system 700. In some implementations, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a-trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. Accordingly, other implementations are within the scope of the following claims:

What is claimed is:

1. A method of retrieving a page of records from a database system, the method comprising:
    receiving a first query from a client device that, when processed by the database system, identifies a plurality of records in a database, the plurality of records having a specified order and being transmittable to the client device in pages, each page comprising a fixed number of records from the plurality of records;
    receiving input identifying a specific page of records to retrieve and transmit to the client device;

generating a second query from the first query and the received input, wherein the second query, when processed by the database system,
- (i) identifies a first subset of the plurality of records, the first subset consisting of records having positions in the specified order from a first position to a position corresponding to a last record of the identified specific page of records;
- (ii) identifies a second subset of the plurality of records including records having positions corresponding to a record that immediately precedes the identified specific page of records and in the specified order from the first position to a position corresponding to the fixed number multiplied by a number corresponding to the identified specific page of records, minus the fixed number; and
- (iii) determines records in the first subset that are not in the second subset;

submitting the second query to the database system for processing to retrieve the determined records; and transmitting the retrieved, determined records to the client device.

2. The method of claim 1, wherein identifying the first subset comprises identifying records having positions in the specified order from the first position to the position corresponding to the fixed number multiplied by a number corresponding to the identified specific page of records.

3. The method of claim 1, wherein the first query is a first structured query language (SQL) statement.

4. The method of claim 1, wherein determining records in the first subset that are not in the second subset comprises determining identifiers for the records.

5. The method of claim 4, wherein the identifiers are database keys or globally unique identifiers.

6. The method of claim 1, further comprising receiving the fixed number of records per page.

7. An apparatus embodying a computer program in a computer-readable storage medium, the apparatus comprising instructions that, when executed, cause a database query processing apparatus to perform operations comprising:

receiving a first query from a client application in a client device that, when processed by a database system, identifies a plurality of records in a database, the plurality of records having a specified order and being transmittable to the client device in pages, each page comprising a fixed number of records from the plurality of records;

receiving input from the client application identifying a specific page of records to retrieve and transmit to the client device;

generating a second query from the first query and the received input, wherein the second query, when processed by the database system,
- (i) identifies a first subset of the plurality of records, the first subset consisting of records having positions in the specified order from a first position to a position corresponding to a last record of the identified specific page of records;
- (ii) identifies a second subset of the plurality of records including records having positions corresponding to a record that immediately precedes the identified specific page of records and in the specified order from the first position to a position corresponding to the fixed number multiplied by a number corresponding to the identified specific page of records, minus the fixed number; and
- (iii) determines records in the first subset that are not in the second subset;

submitting the second query to the database system for processing to retrieve the determined records; and transmitting the retrieved, determined records to the client device.

8. A method of retrieving a page of data records from a relational database management system comprising:

receiving from a client application in a client device, in a system from which data records in the relational database management system (RDBMS) are accessible by submission of one or more structured query language (SQL) statements to and subsequent execution of the one or more submitted SQL statements by the RDBMS, a first SQL statement that, if executed by the RDBMS would retrieve a plurality of data records in a specific order;

receiving from the client application a number corresponding to a requested page of data records from the plurality of data records;

generating a second SQL statement from the first SQL statement, wherein the second SQL statement, when executed by the RDBMS, retrieves records that are in a first subset of the plurality of data records but not in a second subset of the plurality of data records, wherein the first subset consists of data records in the plurality of data records having positions in the specific order ranging from a first position to a position corresponding to a last record of the requested page of data records, and wherein the second subset including records having positions corresponding to a record that immediately precedes the requested page of data records and in the specified order from the first position to a position corresponding to the fixed number multiplied by a number corresponding to the identified request page of data records, minus the fixed number;

submitting the second SQL statement to the RDBMS for execution; and providing data records retrieved by execution of the second SQL statement to the client application.

* * * * *